United States Patent [19]
Mizoguchi

[11] Patent Number: 6,021,686
[45] Date of Patent: Feb. 8, 2000

[54] POWER TRANSMISSION DEVICE FOR AN INTERNAL-COMBUSTION ENGINE

[75] Inventor: Naoki Mizoguchi, Hamamatsu, Japan

[73] Assignee: Suzuki Motor Corporation, Shizuoka-ken, Japan

[21] Appl. No.: 09/122,282

[22] Filed: Jul. 24, 1998

[30] Foreign Application Priority Data

Sep. 1, 1997 [JP] Japan ................................. 9-236095

[51] Int. Cl.[7] .................................................. F16H 55/18
[52] U.S. Cl. .................................. 74/440; 74/409; 74/443
[58] Field of Search .......................... 74/409, 440, 443; 192/213; 464/64; 267/168

[56] References Cited

U.S. PATENT DOCUMENTS

| | | | |
|---|---|---|---|
| 2,310,232 | 2/1943 | Hale | 74/440 |
| 3,380,566 | 4/1968 | Cook | 192/213 |
| 3,648,534 | 3/1972 | Fagarazzi | 74/440 |
| 4,254,855 | 3/1981 | Hildebrand et al. | 192/213 X |
| 4,741,423 | 5/1988 | Hayen | 464/68 X |
| 4,912,998 | 4/1990 | Sugano et al. | 74/440 X |
| 5,322,474 | 6/1994 | Hashimoto et al. | 464/68 |
| 5,540,620 | 7/1996 | Haneda et al. | 192/213 X |
| 5,782,694 | 7/1998 | Honjo et al. | 464/68 X |
| 5,870,928 | 2/1999 | Genter et al. | 74/440 |

FOREIGN PATENT DOCUMENTS

| | | | |
|---|---|---|---|
| 58-8864 | of 0000 | Japan . | |
| 61-23968 | of 0000 | Japan . | |
| 13960 | 1/1988 | Japan | 74/440 |

Primary Examiner—Tamara L. Graysay
Assistant Examiner—Brandon C. Stallman
Attorney, Agent, or Firm—Darby & Darby

[57] ABSTRACT

A power transmission device has a primary driven gear and a scissor gear arranged abreast in a superimposed manner concentrically with the primary driven gear so as to be shiftable from it. Both the gears have plural pairs of openings superimposable to each other, so that each pair of the openings form an opening space. In each opening window a damper spring is provided and compressed so that the spring's ends press both edges of the opening space, with the spring's side portions engaged with the side face of the rotor so that one or both the primary driven gear and scissor gear, are resiliently coupled with the rotor by way of the damper springs. Further, for each damper spring, a scissor spring having a smaller diameter than that of the damper spring is inserted inside the damper spring so that the ends of the scissor spring press both edges of the openings, to thereby urge and regulate the primary driven gear and scissor gear so as to keep the phase difference therebetween with respect to the rotational direction thereof, constant in a steady state.

2 Claims, 8 Drawing Sheets

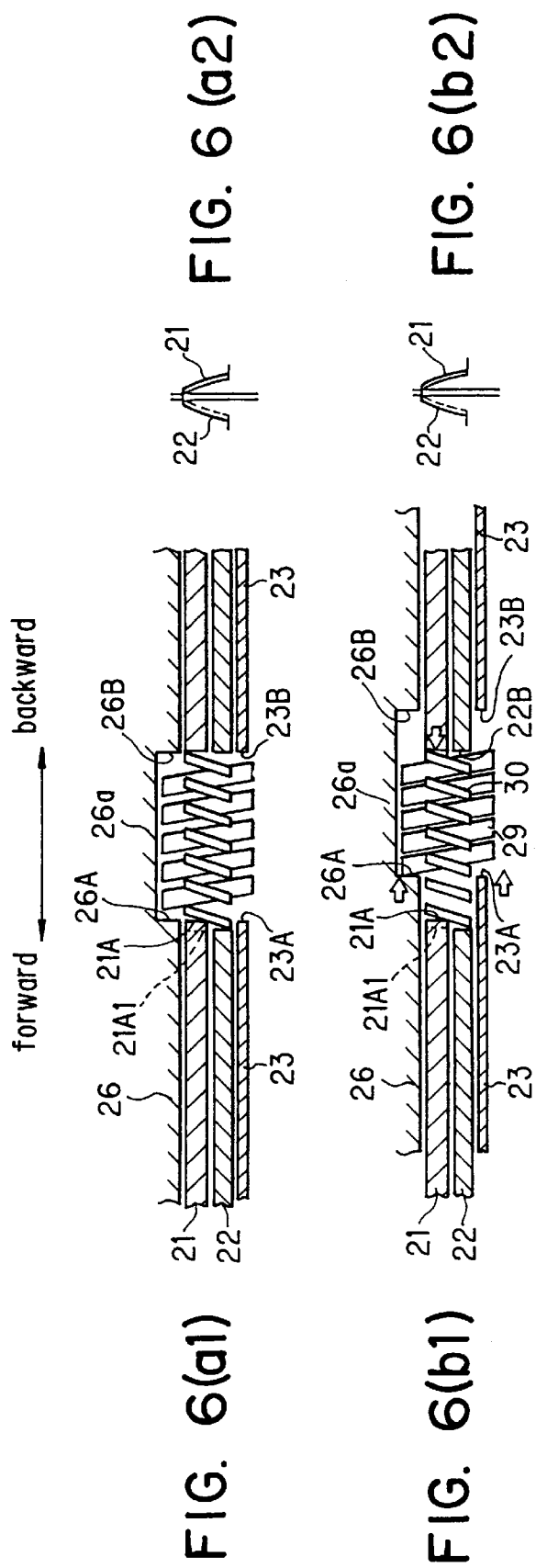

POWER TRANSMISSION DEVICE FOR AN INTERNAL-COMBUSTION ENGINE

BACKGROUND OF THE INVENTION (1). Field of the Invention

The present invention relates to a power transmission device for an internal-combustion engine for use in a motorcycle or the like, and in particular relates to an improvement of the primary driven gear meshing with the drive gear provided on the crankshaft.

(2). Description of the Prior Art

As is well known, motorcycles employ a power transmission device for transmitting the driving force of the internal-combustion engine to the drive shaft. This power transmission device is typically constructed so that the rotation of the crankshaft is transmitted through the drive gear that rotates together with this crankshaft, to a primary driven gear, and further this rotational power force is transmitted to the driven shaft in an appropriate manner, via a clutch mechanism provided on the side of the driven gear.

In such a power transmission device, there is a problem in that rotational irregularities of the crankshaft or the like causes a chatter or collision noise between the teeth of the primary driven gear and the drive gear, which is the main factor of high noise generation in the power transmission device. Since chatter is generated due to backlash formed between the aforementioned two gears, a conventional configuration has been proposed and implemented in which a scissor gear is additionally provided for the primary driven gear so that the aforementioned two gears will mesh with each other without producing any backlash. This scissor gear is of the same diameter and the same number of teeth as the primary driven gear, and is adapted to be arranged in a superimposed manner, on one side of the primary gear and is configured so that springs are inserted through openings formed in the two gears to continuously produce a constant phase difference between the two gears.

In the above case in which a scissor gear is provided for the primary driven gear, the geometrical arrangement of the scissor springs is very important. It is desired that the scissor springs be located as distant from the center as possible in view of reducing the spring size and strength and all the springs be arranged in a balanced manner.

However, the primary driven gear and scissor gear are formed with openings for damper springs that link the clutch mechanism, through-holes for engaging the clutch housing and the like. Accordingly, it has been very difficult to arrange the springs in a good enough manner to meet the above requirements.

There is also a conventional configuration using damper springs and a scissor gear (refer to Japanese Utility Model Publication Sho 61 No.23,968) in which some of multiple damper springs are used as the scissor springs. This configuration, however, suffers from a problem in that while the springs having both functions are functioning as the damper springs, the spring forces on the springs acting as the scissor springs vary, and thus the functionality of the scissor spring fluctuates.

A further conventional configuration using scissor springs and damper springs has been disclosed in Japanese Patent Application Laid-Open Sho 58 No.8,864, in which two types of rubber dampers are used in combination. However, this has a problem of low durability because of the rubber dampers.

SUMMARY OF THE INVENTION

The present invention has been devised in view of the problems of the prior art discussed above, and it is therefore an object of the present invention to provide a power transmission device excellent in durability, in which when the scissor gear is attached to the primary driven gear, the scissor springs can be easily mounted in appropriate positions in a manner which allows independent functionality of the scissor springs from the damper springs.

In order to achieve the above object, the present invention is configurated as follows:

In accordance with the first aspect of the invention, a power transmission device for use in an internal-combustion engine, comprises:

- a primary driven gear meshing with the drive gear rotating with the crankshaft of the internal-combustion engine, the primary driven gear having a greater number of teeth than the drive gear;
- a rotor provided concentrically with, close to, and abreast of one side of the primary driven gear so as to be engageable with the primary driven gear with respect to the rotating direction, wherein the rotation of the crankshaft is transmitted from the primary drive gear to the primary driven gear, whilst reducing the speed of rotation, and the reduced rotation is further transmitted from the primary driven gear to the drive shaft by way of the rotor;
- a scissor gear having the same diameter and the same number of teeth as the primary driven gear and arranged in a superimposed manner, concentrically with the primary driven gear so as to be phase-shiftable therefrom, wherein the scissor gear and the primary driven gear have plural pairs of openings superimposable with each other, each opening pair forming an opening space;
- a plurality of coil-like damper springs, each provided and compressed within each opening space so that the ends of the damper springs press both edges, with respect to the rotational direction of the gears, of the opening space, with the side portions of the damper springs projected to the sides from the opening space to be engaged with the side face of the rotor so that at least one or both the primary driven gear and scissor gear, are resiliently coupled with the rotor by way of the damper springs; and
- a plurality of coil-like scissor springs, each having a smaller diameter than that of the damper springs and being inserted inside the damper springs and compressed within each opening space so that the ends of the scissor springs press both edges, with respect to the rotational direction of the gears, of the opening space, to thereby urge and regulate the primary driven gear and scissor gear so as to keep the phase difference therebetween with respect to the rotational direction thereof, constant and in a steady state.

In accordance with the second aspect of the invention, the power transmission device for use in an internal-combustion engine, having the above first feature, is characterized in that, when the front edges of the two corresponding openings of the scissor gear and primary driven gear are set at the same position, the rear edge of the opening of the scissor gear, against which the damper spring is to be abutted, is positioned rearward compared to the rear edge of the opening of the primary driven gear, against which the damper spring is to be abutted.

In accordance with the above first feature of the invention, when the motorcycle is driven in a steady state in which the crankshaft thereof has no rotational variation, the scissor gear and primary gear are kept with the predetermined phase difference by the urging force of the scissor springs, whereby the primary driven gear and drive gear are kept in mesh without any backlash by the help of the scissor gear. If some torque acting on the primary driven gear arises due to rotational variations of the crankshaft, the scissor springs function to reduce the impact between the scissor gear and drive gear, to thereby prevent generation of teeth chatter noise between these two gears.

On the other hand, impacts upon clutch engagement etc., are transferred to the rotor, the impact acting on the rotor, however is damped due to the resilient force of the damper springs because the rotor and the primary driven gear are resiliently coupled through the damper springs. During this damping, the positional relationship between the scissor gear and the primary driven gear will not be affected by the behavior of the damper springs. Thus, the scissor springs and the damper springs function independently from each other.

Moreover, since each scissor spring is incorporated inside the damper spring, only the space of the openings for receiving the damper springs may and need to be taken into account for attaching the scissor springs. As a result, it is possible to very easily design the allocation of the scissor springs compared to the conventional configuration in which both the damper springs and the scissor springs needed individual mounting spaces.

In accordance with the second feature of the invention, the front edges of two types of the openings in the steady state are in flush with each other due to the resilient force of the scissor springs, while the rear edges of the openings, abutting against each damper spring are displaced back and forth from each other. More explicitly, the edges of the scissor gear are located rearward compared to those of the primary driven gear. Accordingly, even when the scissor gear moves forward relative to the primary driven gear so as to reduce the phase difference, the edges of the openings in the scissor gear abutting against the ends of the damper springs will not project further forward than the abutting positions of the primary driven gear opening edges. As a result, the damper springs will be held between the front and rear edges of the primary driven gear openings, thus the urging force of the damper springs will not act only on the scissor gear, which is generally formed in a delicate or fragile configuration compared to the primary driven gear, resulting in capacity of avoiding the breakage of the scissor gear.

BRIEF DESCRIPTION OF THE DRAWINGS

FIG. 6(a2) is a schematic of the phase difference due to the urging force of the scissor spring under the operating conditions of FIG. 6(a1);

FIG. 6(b1) is a transverse sectional view of the linking state of the scissor gear, primary gear and springs shown in FIG. 3 during accelerational driving;

FIG. 6(b2) is a schematic of the phase difference between the scissor gear and primary gear under the operating conditions of FIG. 6(b1);

FIG. 6(c1) is a transverse sectional view of the linking state of the scissor gear, primary gear and springs shown in FIG. 3 during decelerational driving;

FIG. 6(c2) is a schematic of the phase difference between the scissor gear and primary gear under the operating conditions of FIG. 6(c1);

FIG. 6(d1) is a transverse sectional view of the linking state of the scissor gear, primary gear and springs shown in FIG. 3 during steady state driving as the scissor gear is urged relative the primary driven gear in the moveable direction;

FIG. 6(d2) is a schematic of the phase difference between the scissor gear and primary gear under the operating conditions of FIG. 6(c1);

FIG. 6(e1) is a transverse sectional view of the linking state of the scissor gear, primary gear and springs shown in FIG. 3 during accelerational driving as the scissor gear is urged relative to the primary driven gear in the moveable direction;

FIG. 6(e2) is a schematic of the phase difference between the scissor gear and primary gear under the operating conditions of FIG. 6(e1);

FIG. 6(f1) is a transverse sectional view of the linking state of the scissor gear, primary gear and springs shown in FIG. 3 during decelerational driving;

FIG. 6(f2) is a schematic of the phase difference between the scissor gear and primary gear under the operating conditions of FIG. 6 (f1)

DESCRIPTION OF THE PREFERRED EMBODIMENTS

The embodiment of the invention will hereinafter be described in detail with reference to the accompanying drawings.

Figure 1:
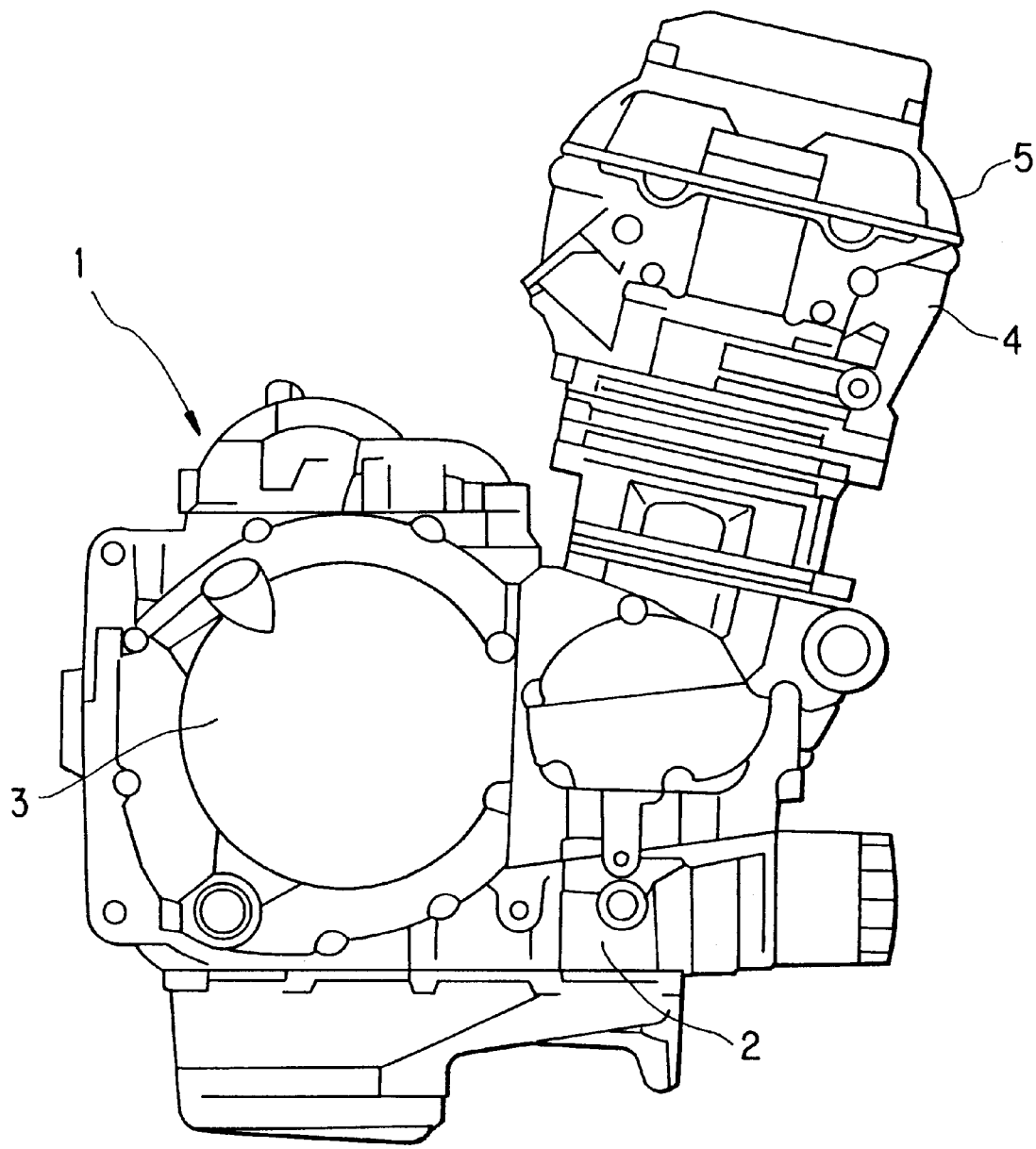
FIG. 1 is a side view showing an internal-combustion engine applied to an embodiment in accordance with the invention.
Figure 2:
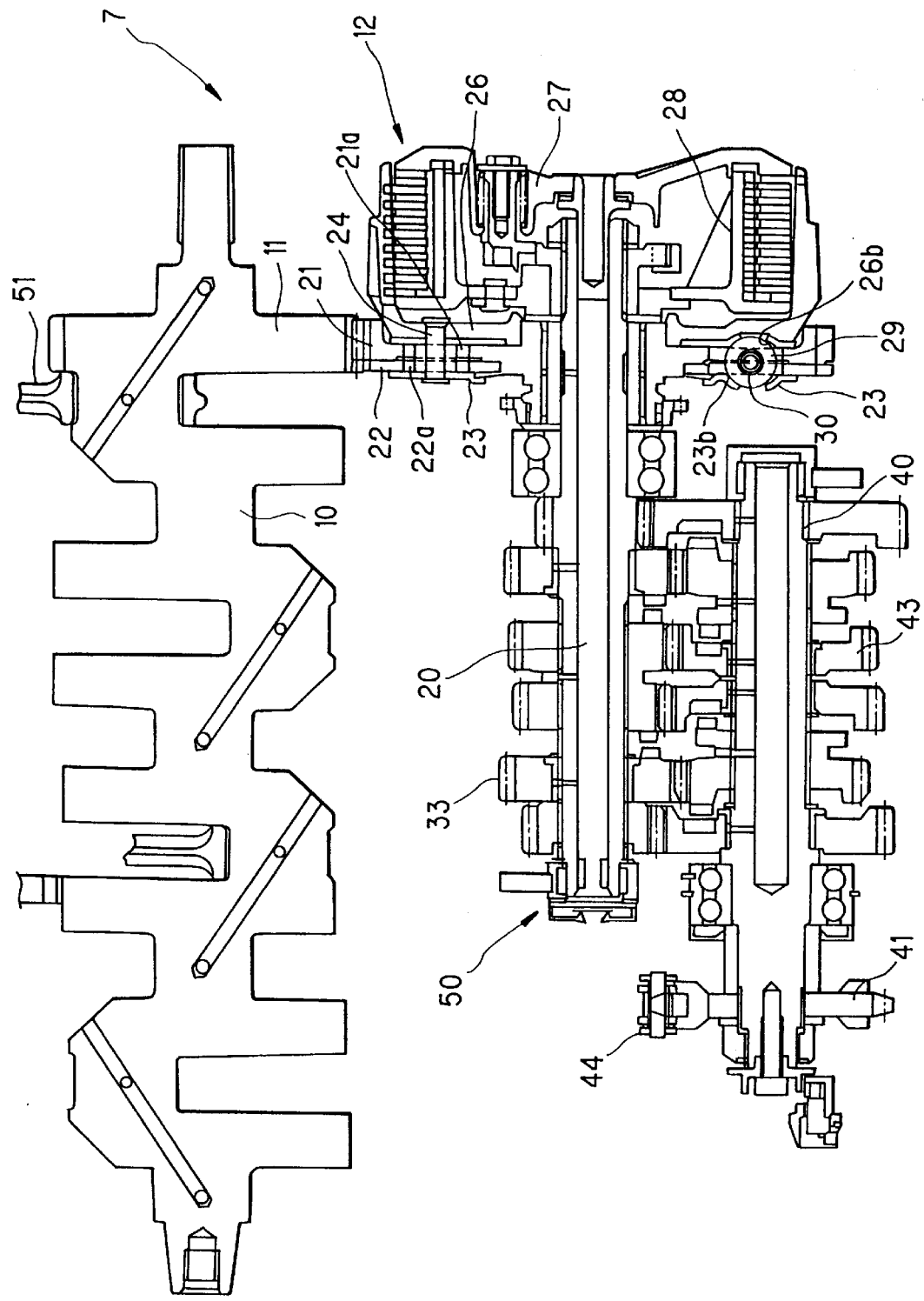
FIG. 2 is a vertical sectional side view of the internal-combustion engine shown in FIG. 1.
Figure 3:
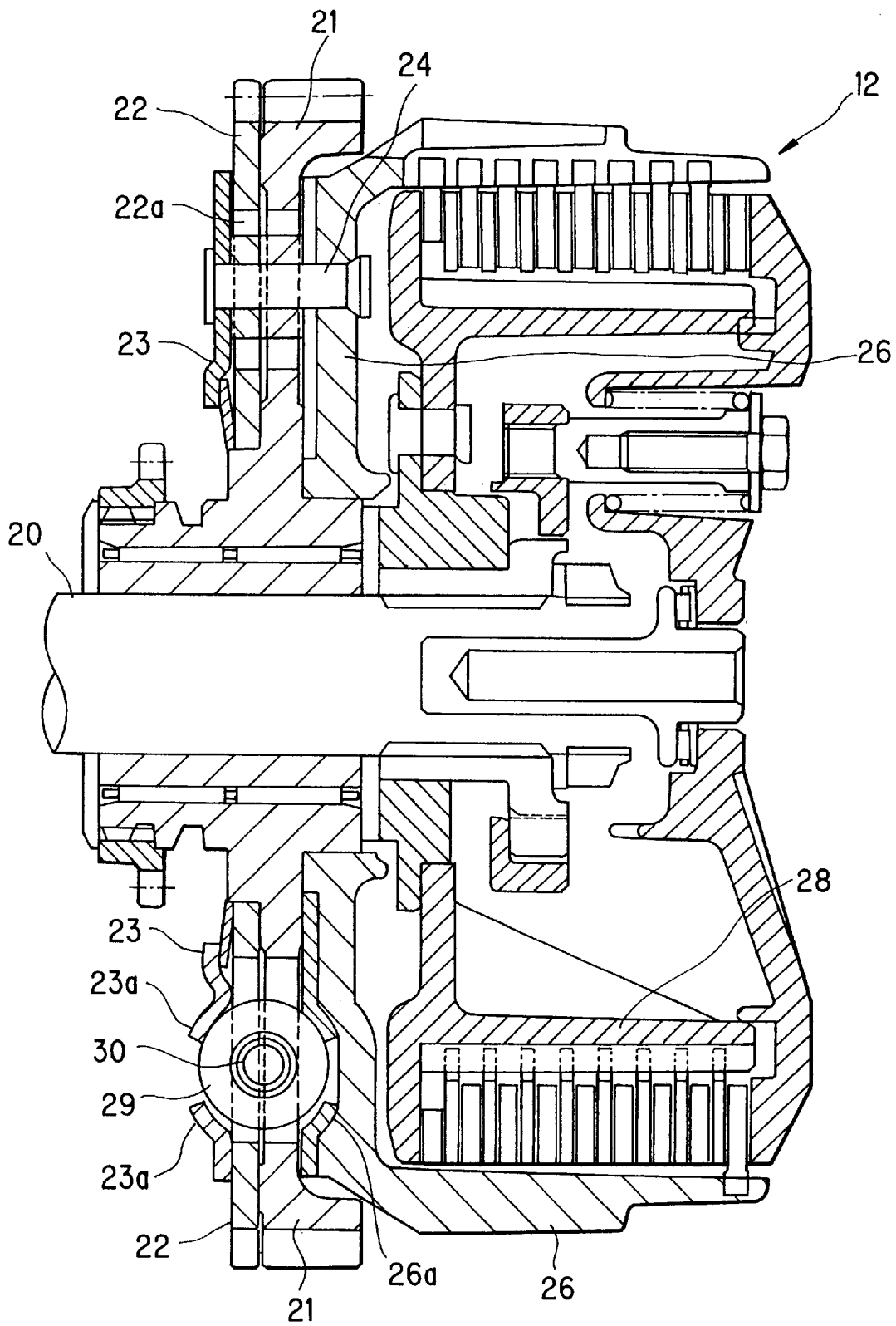
FIG. 3 is an enlarged vertical sectional side view of that shown in FIG. 2.
Figure 4:
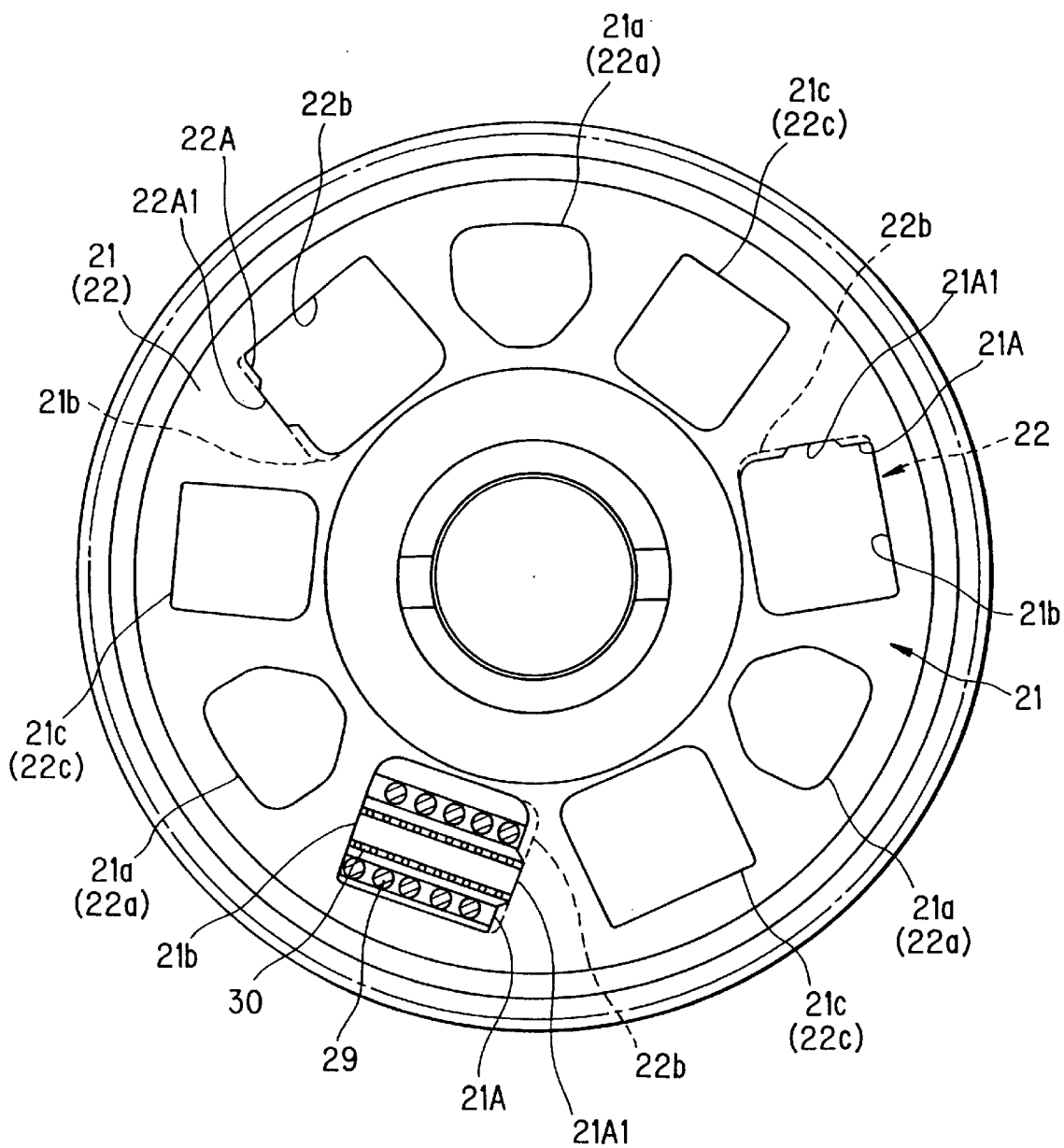
FIG. 4 is a side view showing the configuration of the primary driven gear shown in FIG. 3.
Figure 5:
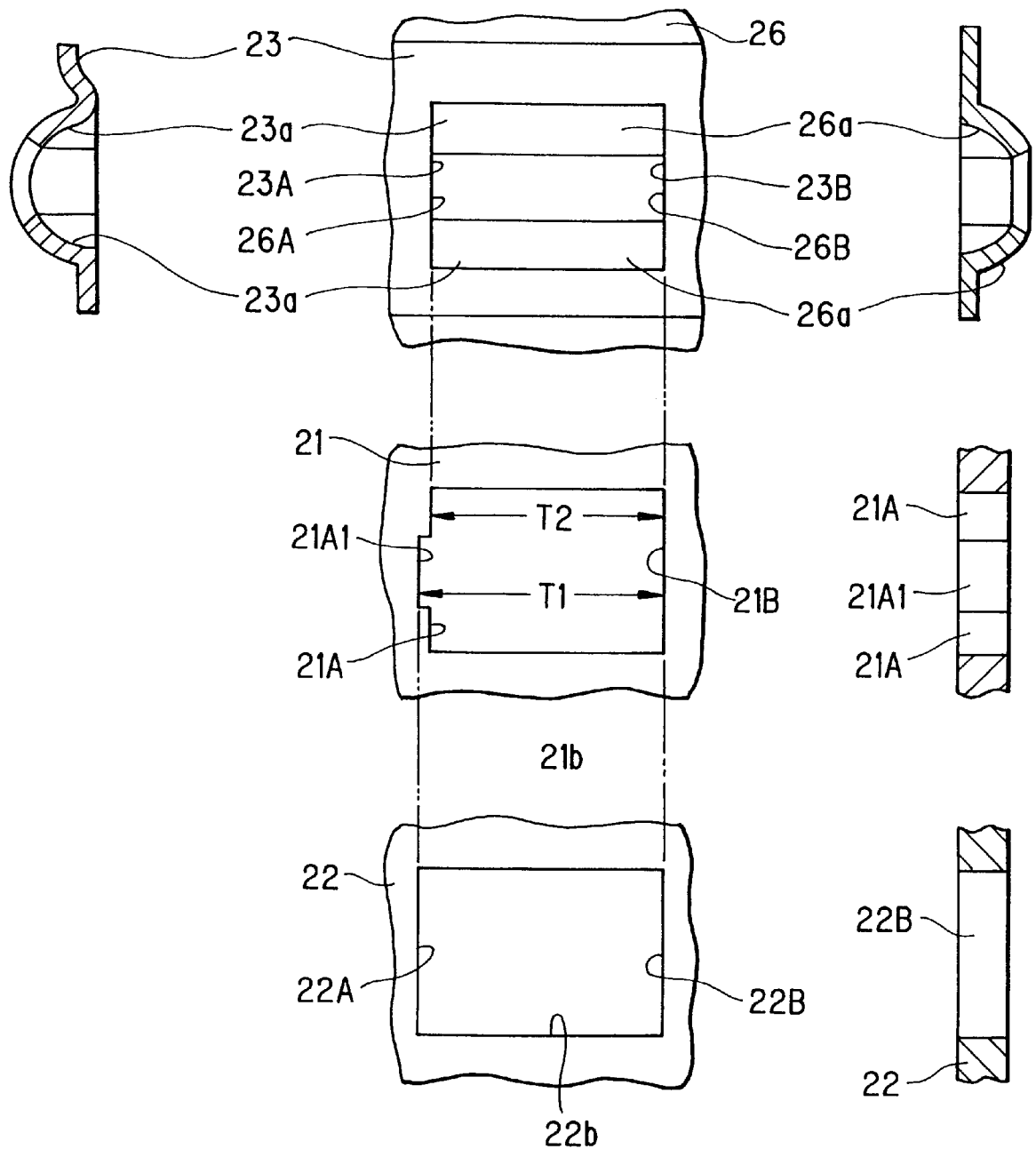
FIG. 5 is an illustration showing the side views of the shapes of the openings formed in the scissor gear, primary driven gear and inner cylinder shown in FIG. 3.
Figure 6:
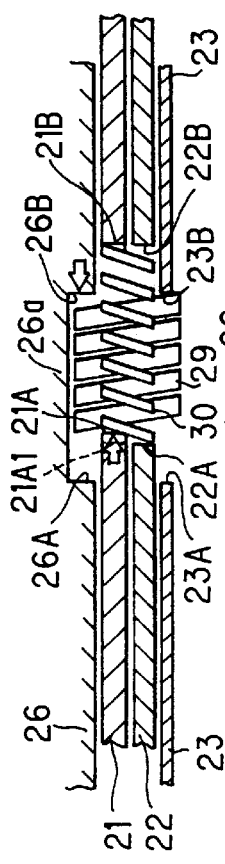
FIG. 6(a1) is a transverse sectional view of the linking state of the scissor gear, primary gear and springs shown in FIG. 3 in a steady state configuration with small variations in rotational torque.

FIG. 1 is a side view showing an internal-combustion engine applied to the embodiment in accordance with the invention; FIG. 2 is a vertical sectional side view showing the internal-combustion engine shown in FIG. 1; FIG. 3 is an enlarged vertical sectional side view of that shown in FIG. 2; FIG. 4 is a side view showing the configuration of the primary driven gear shown in FIG. 3; FIG. 5 is an illustration showing the side views of the shapes of the openings formed in the scissor gear, primary driven gear and inner cylinder shown in FIG. 3; and FIG. 6 show illustrative transverse sectional views showing the operation of the scissor gear, primary gear, etc., shown in FIG. 3.

An internal-combustion engine 1 shown in FIG. 1 has an outer casing which is formed by a crankcase 2, clutch cover 3, cylinder heads 4, a cylinder head cover 5 and the like. Provided and supported rotatably inside crankcase 2 is a crankshaft 10 which changes the reciprocating motion of the pistons inside cylinder heads 4 into rotational motion by means of the connecting rods 51. Further, a power transmission device 7 for transmitting the rotational force of crankshaft 10 to the rear wheel is housed in crankcase 2. This power transmission device 7 has a clutch mechanism 12, which is enclosed by clutch cover 3.

Arranged in parallel in power transmission device 7 are crankshaft 10, countershaft 20 and drive shaft 40. The rotational force of crankshaft 10 is transmitted from a small-diametric primary drive gear 11 fixed on crankshaft 10 to a large-diametric primary driven gear 21 supported by countershaft 20, hence the speed of rotation is reduced. The transmitted drive force is then transmitted to countershaft 20 via clutch mechanism 12. This rotation of countershaft 20 is transmitted to drive shaft 40 by way of the change gear mechanism including a drive gear 33, driven gear 43, etc., and the driving force is further transferred from drive shaft 40 to the driven sprocket by way of a drive sprocket 41 and a chain 44.

In order to eliminate chatter noise between the teeth of primary drive gear 11 and primary driven gear 21 when meshing with each other, a scissor gear 22 having a relatively thin facewidth is attached in a superimposed manner beside primary driven gear 21. This scissor gear 22 has the same diameter and the same number of teeth as primary driven gear 21 and is configured so that it can be moved to a position producing the predetermined phase difference from the position in phase with primary driven gear 21.

In this configuration, a clutch housing (rotor) 26 of a cup-shaped cylinder is positioned on the outer side of primary driven gear 21, and a disc-like back plate 23 is positioned on the outer side of scissor gear 22. A plurality of crimping pins 24 are used to join clutch housing 26 and back plate 23, being loosely inserted through through-holes 21a and 22a (see FIG. 4) formed at plural sites (three sites in this case) in the aforementioned two gears 21 and 22. Thus, the two gears 21 and 22 can individually rotate back and forth within a range limited by the abutment of crimping pins 24 against the front and rear edges of through-holes 21a and 22a.

As shown in FIG. 4, primary driven gear 21 and scissor gear 22 have, in addition to through-holes 21a and 22a, spring insert openings 21b, 22b, and openings 21c and 22c through which unillustrated damper springs are inserted, equi-angularly arranged at three sites, respectively, in the circumferential direction. Clutch housing 26 and back plate 23 have curved portions 26a and 23a, respectively as shown in FIG. 3. More specifically, these curved portions 23a and 26a are provided equi-angularly at three sites corresponding to spring insert openings 21b and 22b. Here, it should be noted that the openings 21b and 22b are provided as distant from the center of gears 21 and 22 as possible.

FIG. 5 is an illustration showing openings 21b, 22b, and curved portions 23a and 26a. In this figure, 21A and 21B designate the front and rear edges of opening 21b of primary driven gear 21; 22A and 22B designate the front and rear edges of opening 22b of scissor gear 22; 23A and 23B designate the front and rear edges of curved portion 23a of back plate 23; and 26A and 26B designate the front and rear edges of curved portion 26a of clutch housing 26.

Illustratively, the front edge 21A of opening 21b of primary driven gear 21 has a recess 21A1 depressed in a forward manner. The distance T1 from this recess 21A1 to the rear edge 21B is set equal to the distance between front edge 22A and rear edge 22B of opening 22b of scissor gear 22. On the other hand, the distance between the front and rear edges of curved portions 23a and 26a of back plate 23 and clutch housing 26 (the distance between 23A and 23B, and that between 26A and 26B) is set equal to the distance T2 between the front edge 21A and the rear edge 21B of opening 21b.

Of these openings, damper spring 29 made up of a coil spring is inserted into spring insert openings 21b and 22b. This damper spring 29 has a free length shorter than the distance T2 (T2<T1) between the front and rear edges of opening 21b with its coil diameter greater than the sum of the facewidths of the two gears 21 and 22 so that side parts of the coil project outward from the outer side-surface the gears 21 and 22, as is shown in FIG. 3. These projected portions of damper spring 29 are covered by curved portion 26a of clutch housing 26 and curved portion 23a of back plate 23 so as to prevent it dropping out or being lost from openings 21b and 22b.

A scissor spring 30 having a smaller diameter and a greater free length than damper spring 29 is inserted therein. This scissor spring 30 is inserted and compressed at both ends, within openings 21b and 22b of primary driven gear 21 and scissor gear 22. More specifically, the rear end of scissor spring 30 is set to press the rear edge 21B of opening 21b of primary driven gear 21 and the rear edge 22B of opening 22b of scissor gear 22 while the front end of scissor spring 30 is set to press the recess 21A1 of opening 21b and the front edge 22A of opening 22b.

The damper springs (not shown) inserted in openings 21c and 22c have a lower spring constant than that of damper spring 29, and constantly press both the front and rear edges of openings 21c and 22c so as to continuously receive loads during driving.

In the above configuration, in a steady state where the variation in the rotational torque applied to primary driven gear 21 is small, as during driving at a constant speed, the contraction of scissor spring 30 becomes minimal as shown in in FIG. 6 (a1), and scissor gear 22 and primary driven gear 21 go out of phase due to the urging force from spring 30 as shown in in FIG. 6 (a2). As a result, the composite gears consisting of primary driven gear 21 and scissor gear 22 mesh with primary drive gear 11 with any backlash nullified so as to prevent generation of teeth chatter noise as the teeth mesh. In this steady state, damper spring 29 located around scissor spring 30 is kept at its free length because no external pressing force acts thereon.

During accelerational driving as shown in FIG. 6(b1), torque applied to primary driving gear 21 through primary drive gear 11 from crankshaft 10 increases, and hence the opening's rear edges 21B and 22B of primary driven gear 21 and scissor gear 22 press the rear end of damper spring 29. This causes the front end of damper spring 29 to press against the front edges 23A and 26A of curved portions 23a and 26a in back plate 23 and clutch housing 26, so that damper spring 29 is compressed between rear edges 21B, 22B and front edges 23A, 26A. As a result, the impact acting on primary driving gear 21 due to torque increase is reduced by damper spring 29. At this time, no force acts on scissor gear 22 in its movable direction (in the forward direction), so that the positional relationship between primary driven gear 21 and scissor gear 22 will not change at all, with scissor spring 30 kept in its initial compressed state (minimal compression state). Therefore, the phase difference between the two gears 21 and 22 still remains FIG. 6(b2), whereby the engagement of composite gears 21 and 22 with primary drive gear 11, with the backlash eliminated, remains.

During decelerational driving, the torque acting on the rear wheel transmits to chain 44, drive sprocket 41 and drive shaft 40. This is transmitted to gears 43 and 33, and further transmitted to clutch housing 26 in clutch mechanism 25 and back plate 23 by way of countershaft 20. As a result, the curved portions 26a and 23a of clutch housing 26 and back plate 23 move forward relative to composite gears 21 and 22 as shown in FIG. 6(c1). Therefore, rear edges 26A and 23A of curved portions 26a and 23a press the rear end of damper spring 29 forward, hence causing the front end of spring 29 to abut the front edge 21A of opening 21b of primary driven gear 21, whereby damper spring 29 is compressed between front edge 21A and rear edges 26A and 23A. In this way, the impact due to variations of torque during deceleration can be absorbed and reduced by damper spring 29. Also in this case, the positional relationship between primary driven gear 21 and scissor gear 22 will not change at all (see FIG. 6(c2), with scissor spring 30 kept in its initial compressed state. Thus, primary drive gear 11 meshes with composite gears 21 and 22 with any backlash eliminated.

In the aforementioned steady driving mode, FIG. 6(d1) shows when the scissor gear 22 is urged relative to the primary driven gear in the direction (in the moveable direction) in which the phase difference is decreasing, and when the teeth of the two gears 21 and 22 come into phase as shown in in FIG. 6 (d2), scissor spring 30 is pressed at the rear end thereof against rear edge 21B of opening 21b in primary driven gear 21 while the front end thereof abuts front edge 22A of opening 22b in scissor gear 22 so that the spring is compressed. In this case, the moving distance of scissor gear 22 relative to primary driven gear 21 is designed to be shorter than the difference between distance T2 across curved portion 26a of clutch housing 26 and the free length of damper spring 29, therefore when the phase difference between scissor gear 22 and primary driven gear 21 decreases (i.e., scissor spring 30 is compressed), the length of damper spring 29 will not be changed by the motion of the two gears 21 and 22.

In the aforementioned accelerational mode, if scissor gear 22 moves in the direction (moveable direction) in which the phase difference is decreasing (see FIG. 6(c1) and the two gears come into phase as shown in in FIG. 6 (e2), scissor gear 22 will not abut damper spring 29, and hence have no influence on it at all (see in FIG. 6 (e1)). Accordingly, also in this mode, scissor spring 30 and damper spring 29 operate independently of each other.

In the aforementioned decelerational mode, when scissor gear 22 has moved and the two gears 21 and 22 come in phase as seen in in FIG. 6 (f2), damper spring 29 abuts, at the rear end thereof, against rear edges 26B and 23B in clutch housing 26 and back plate 23 while the front end of the spring abuts only the front edge 26A of opening 26a of primary driven gear 21, not abutting rear edge 22B of opening 22a of scissor gear 22 (see in FIG. 6(f1)). Accordingly, the positional relationship between primary driven gear 21 and scissor gear 22 will not be changed by damper spring 29, and again in this case the two springs 29 and 30 move independently from each other.

In this embodiment, front edge 21A of the opening of primary driven gear 21 is formed with recess 21A1. Accordingly, in the decelerational driving mode, scissor gear 22 moves in the direction in which the phase difference is decreasing, but front edge 22A of the opening in scissor gear 22 will not extend rearward, beyond front edge 21A of primary driven gear 21. Thus the front end of damper spring 29 will not abut front edge 22A of the opening in scissor gear 22. Therefore, it is possible to prevent scissor gear 22, which is formed with a thinner facewidth and is hence more breakable than primary driven gear 21, from, by itself, directly receiving the torque during deceleration, to thereby avoid breakage of scissor gear 22.

If scissor gear 22 is configured to have high enough strength, openings 21b and 22b of the two gears 21 and 22 may be formed with the same shape, without providing any recess 21A1 for opening 21b of primary driven gear 21.

Figure 7:
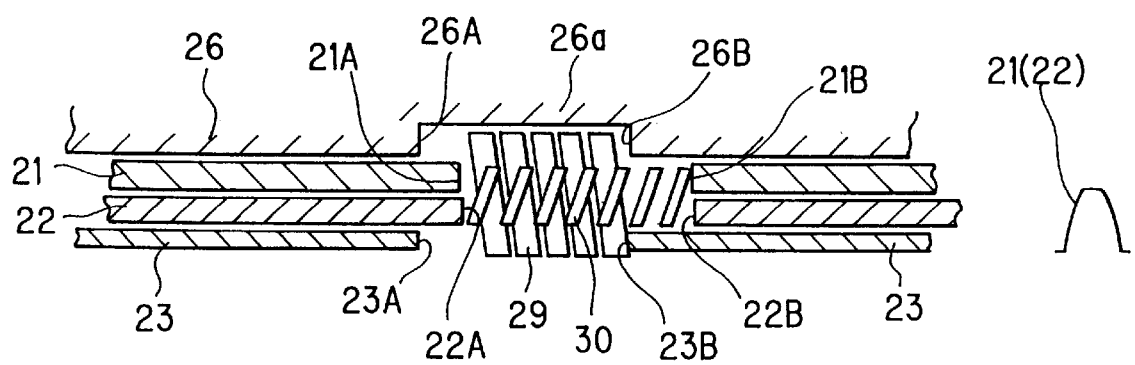
FIG. 7 is an illustrative transverse sectional view showing the linking state of the scissor gear, primary driven gear and springs when no recess is formed in the primary driven gear.

In this case where openings 21b and 22b of the two gears 21 and 22 are formed with the same shape, when the scissor gear moves in the direction in which the phase difference is decreasing, in the decelerational mode, front edge 22A of opening 22b in scissor gear 22 will project rearward extending beyond front edge 21A of opening 21b of primary driven gear 21 as shown in FIG. 7. Therefore, the damper springs are held by primary driven gear 21, clutch housing 26 and back plate 23, while applying torque to scissor gear 22. However, there should be no concern of breakage, that is, this configuration should be free from problems as long as scissor gear 22 has a high enough strength.

As has been described, in accordance with the invention, in the power transmission device for an internal-combustion engine in which damper springs and scissor springs are provided for the primary driven gear and scissor gear, the damper springs and scissor springs can function independently from each other, and still be arranged them at the same locations. Accordingly, it is possible to markedly reduce the space for installation of these springs as well as to easily and properly locate the springs, thus providing improved flexibility in the gear design.

Further, concerning the through-holes or openings of the scissor gear and primary driven gear, even in the configuration in which, when the front edges of the two corresponding openings, with respect to the direction In which the phase difference of the scissor gear is decreasing are set at the same position, the rear edge of the opening of the scissor gear is positioned rearward compared to the rear edge of the opening of the primary driven gear, so it is possible to avoid high torque acting on the scissor gear only, thus improving durability even if the scissor gear is of a delicate or fragile one.

What is claimed is:

1. A power transmission device for use in an internal-combustion engine, comprising:

a primary driven gear meshing with a drive gear rotating with a crankshaft of the internal-combustion engine, the primary driven gear having a greater number of teeth than the drive gear;

a rotor provided concentrically with, close to, and abreast of one side of the primary driven gear so as to be engageable with the primary driven gear with respect to the rotating direction, wherein the rotation of the crankshaft is transmitted from the primary drive gear to the primary driven gear, whilst reducing the speed of rotation, and the reduced rotation is further transmitted from the primary driven gear to the drive shaft by way of the rotor, said rotor having at least one side face;

a scissor gear having the same diameter and the same number of teeth as the primary driven gear and arranged in a superimposed manner, concentrically with the primary driven gear so as to be phase-shiftable therefrom, wherein the scissor gear and the primary driven gear have plural pairs of openings superimposable with each other, each opening defining a front edge and a rear edge, each opening pair forming an opening space;

a plurality of damper coil springs, each damper spring provided and compressed within each opening space so that the ends of the damper springs press both edges, with respect to the rotational direction of the gears, of the opening space, each damper spring including side portions projected to the sides from the opening space to be engaged with the side face of the rotor so that at least one or both the primary driven gear and scissor gear, are resiliently coupled with the rotor by way of the damper springs; and a plurality of scissor coil springs, each scissor spring having a smaller diameter than that of the damper springs and being inserted inside the damper springs and compressed within each opening space so that the ends of the scissor springs press both edges, with respect to the rotational direction of the gears, of the opening space, to thereby urge and regulate the primary driven gear and scissor gear so as to keep a rotational spring force therebetween with respect to the rotational direction thereof, constant and in a steady state.

2. A power transmission device for use in an internal-combustion engine, comprising:

a primary driven gear meshing with a drive gear rotating with a crankshaft of the internal-combustion engine, the primary driven gear having a greater number of teeth than the drive gear;

a rotor provided concentrically with, close to, and abreast of one side of the primary driven gear so as to be engageable with the primary driven gear with respect to the rotating direction, wherein the rotation of the crankshaft is transmitted from the primary drive gear to the primary driven gear, whilst reducing the speed of rotation, and the reduced rotation is further transmitted from the primary driven gear to the drive shaft by way of the rotor said rotor having at least one side face;

a scissor gear having the same diameter and the same number of teeth as the primary driven gear and arranged in a superimposed manner, concentrically with the primary driven gear so as to be phase-shiftable therefrom, wherein the scissor gear and the primary driven gear have plural pairs of openings superimposable with each other, each opening defining a front edge and a rear edge, each opening pair forming an opening space;

a plurality of damper coil springs, each damper spring provided and compressed within each opening space so that the ends of the damper springs press both edges, with respect to the rotational direction of the gears, of the opening space, each damper spring including side portions projected to the sides from the opening space to be engaged with the side face of the rotor so that at least one or both the primary driven gear and scissor gear, are resiliently coupled with the rotor by way of the damper springs; and a plurality of scissor coil springs, each scissor spring having a smaller diameter than that of the damper springs and being inserted inside the damper springs and compressed within each opening space so that the ends of the scissor springs press both edges, with respect to the rotational direction of the gears, of the opening space, to thereby urge and regulate the primary driven gear and scissor gear so as to keep a rotational spring force therebetween with respect to the rotational direction thereof constant and in a steady state, wherein, when the front edges of the two corresponding openings of the scissor gear and primary driven gear are set at the same position, the rear edge of the opening of the scissor gear, against which the damper spring is to be abutted, is positioned rearward compared to the rear edge of the opening of the primary driven gear, against which the damper spring is to be abutted.

* * * * *